US012552128B2

(12) United States Patent
Smith

(10) Patent No.: US 12,552,128 B2
(45) Date of Patent: Feb. 17, 2026

(54) METHOD AND APPARATUS FOR MANUFACTURING CORRUGATED PAPERBOARD

(71) Applicant: Interpac Ltd, Hereford (GB)

(72) Inventor: Charles Tatton Smith, Hereford (GB)

(73) Assignee: Interpac Ltd, Hereford (GB)

( * ) Notice: Subject to any disclaimer, the term of this patent is extended or adjusted under 35 U.S.C. 154(b) by 104 days.

(21) Appl. No.: 18/551,107

(22) PCT Filed: Mar. 23, 2022

(86) PCT No.: PCT/EP2022/057592
§ 371 (c)(1),
(2) Date: Sep. 18, 2023

(87) PCT Pub. No.: WO2022/200405
PCT Pub. Date: Sep. 29, 2022

(65) Prior Publication Data

US 2024/0300204 A1 Sep. 12, 2024

(30) Foreign Application Priority Data

Mar. 23, 2021 (GB) ..................................... 2104035

(51) Int. Cl.
*B31F 1/28* (2006.01)

(52) U.S. Cl.
CPC .......... *B31F 1/2863* (2013.01); *B31F 1/2804* (2013.01)

(58) Field of Classification Search
CPC ............................ B31F 1/2863; B31F 1/2804
See application file for complete search history.

(56) References Cited

U.S. PATENT DOCUMENTS 1,981,338 A 11/1934 Swift
3,053,309 A * 9/1962 Wilson .................. B31F 1/2863 156/472

(Continued)

FOREIGN PATENT DOCUMENTS

AU 1040770 A 7/1971
CN 106273675 A 1/2017

(Continued)

OTHER PUBLICATIONS

Foreign Communication from a Related Counterpart Application, International Preliminary Report on Patentability and Written Opinion dated Oct. 5, 2023, International Application No. PCT/EP2022/057592 filed on Mar. 23, 2022.

(Continued)

*Primary Examiner* — Daniel Jeremy Leeds
(74) *Attorney, Agent, or Firm* — Conley Rose, P.C.

(57) ABSTRACT

A method for manufacturing corrugated paperboard is disclosed. The method comprises: directing a corrugating medium from a corrugating medium supply roll to a pair of corrugating rolls; and operating the pair of corrugating rolls to corrugate the corrugating medium; wherein each corrugating roll is operated at ambient temperature; and wherein the step of operating the pair of corrugating rolls to corrugate the corrugating medium comprises forming a fluted web in which the corrugating medium substantially conforms around a plurality of corrugator peaks and is spaced from a plurality of corrugator troughs in at least one of the pair of corrugating rolls.

13 Claims, 3 Drawing Sheets

(56) References Cited

U.S. PATENT DOCUMENTS

| | | | | |
|---|---|---|---|---|
| 3,540,079 | A | 11/1970 | Bush | |
| 3,920,496 | A | 11/1975 | Wilkinson et al. | |
| 4,584,052 | A | 4/1986 | Baum | |
| 4,853,072 | A * | 8/1989 | Thompson | B31F 1/2818 118/259 |
| 5,419,796 | A | 5/1995 | Miller | |
| 5,685,929 | A | 11/1997 | Bettinelli et al. | |
| 5,846,376 | A | 12/1998 | Gossett et al. | |
| 6,012,501 | A * | 1/2000 | Marschke | B31F 1/2863 156/472 |
| 6,143,112 | A | 11/2000 | Isowa | |
| 6,149,751 | A | 11/2000 | Marschke | |
| 2007/0257402 | A1 | 11/2007 | Rasmussen | |
| 2019/0315085 | A1 | 10/2019 | Kohler | |

FOREIGN PATENT DOCUMENTS

| | | | |
|---|---|---|---|
| EP | 0104372 | A1 | 4/1984 |
| EP | 0850754 | A2 | 7/1998 |
| EP | 0976540 | A2 | 2/2000 |
| EP | 1190843 | A2 | 3/2002 |
| GB | 2513226 | A | 10/2014 |
| WO | 9726132 | A1 | 7/1997 |
| WO | 2000078534 | A1 | 12/2000 |
| WO | 2012123260 | A1 | 9/2012 |
| WO | 2022200405 | A1 | 9/2022 |

OTHER PUBLICATIONS

Foreign Communication from a Related Counterpart Application, Combined Search and Examination Report dated Oct. 29, 2021, United Kingdom Patent Application No. 2104035.7 filed on Mar. 23, 2021.

Pre-filing Novelty Search Report, Developments in your Method and Apparatus for the Manufacture of Corrugated Paperboard for Interpac Limited, Feb. 2020, 15 pages.

Foreign Communication from a Related Counterpart Application, Search Report dated Aug. 14, 2014, United Kingdom Patent Application No. 1402679.3 filed on Feb. 14, 2014.

Foreign Communication from a Related Counterpart Application, International Search Report and Written Opinion dated Jul. 24, 2014, International Application No. PCT/GB2014/050446 filed on Feb. 14, 2014.

Foreign Communication from a Related Counterpart Application, International Search Report and Written Opinion dated Aug. 8, 2022, International Application No. PCT/EP2022/057592 filed on Mar. 23, 2022.

Foreign Communication from a Related Counterpart Application, United Kingdom Examination Report dated Oct. 2, 2024, United Kingdom Application No. 2316018.7 filed on Mar. 23, 2022.

"100 years and Counting", published in Aug. 2021 in the International Paper Board Industry magazine. This article outlines the history of corrugated board manufacture and makes it clear that heat has been used in practice for well over 100 years.

"The Corrugating Industry Steam and Condensate Systems" published in 2014 by Spirax Sarco. This article states on p. 2: "Steam is used for conditioning and to provide the heat necessary in the forming and bonding processes carried out by the machine."

https://en.wikipedia.org/wiki/Corrugated_fiberboard which clearly states "In the classical corrugator, the paper is softened with high-pressure steam".

https://www.themanufacturer.com/articles/how-a-cardboard-box-is-made/ which states "After the paper has gone through a corrugator, in which hot steam is sprayed on the paper to allow it to be pressed, another roller glues one side of the flute".

https://packagingschool.com/articles/how-is-corrugated-made which states "Steam is vital to the corrugated box making process."

Foreign Communication from a Related Counterpart Application, Taiwan Office Action dated Jul. 29, 2025, Taiwan Application No. 111110845 filed on Mar. 23, 2022.

* cited by examiner

METHOD AND APPARATUS FOR MANUFACTURING CORRUGATED PAPERBOARD

CROSS-REFERENCE TO RELATED APPLICATIONS

The present application is a filing under 35 U.S.C. 371 as the National Stage of International Application No. PCT/EP2022/057592, filed Mar. 23, 2022, entitled "A METHOD AND APPARATUS FOR MANUFACTURING CORRUGATED PAPERBOARD," which claims priority to the United Kingdom Application No. 2104035.7 filed with the Intellectual Property Office of the United Kingdom on Mar. 23, 2021, both of which are incorporated herein by reference in their entirety for all purposes.

TECHNICAL FIELD OF THE DISCLOSURE

The disclosure relates to a method of manufacturing corrugated paperboard, an apparatus for manufacturing corrugated paperboard and a corrugated paperboard manufactured using the apparatus and/or method.

BACKGROUND OF THE DISCLOSURE

Corrugated paperboard, sometimes known as corrugated board or simply cardboard, is used throughout the world for the production for cardboard boxes and trays, which provide cheap and practical packaging for a whole range of goods.

However, due to the cost and size of the manufacturing apparatus, only a few, large and expensive factories produce the corrugated paperboard, which is then shipped to the point of use.

Whilst each sheet of corrugated paperboard is not very heavy, the paperboard has a large bulk due to the corrugated nature, and so is disproportionately expensive to ship to individual factories where it is used to package goods. There is also a detrimental effect to the environment with the carbon footprint associated with the shipping of the corrugated paperboard.

A typical prior art paperboard manufacturing apparatus usually consists of a single facer unit, a conveyor bridge and a double facer unit. A corrugating medium, usually paper, is supplied from a supply roll located conveniently near to the single facer unit. Similarly, a further supply roll supplies an inner liner, again usually of paper, to the single facer unit. The inner liner is so-called as it is usually arranged to form an inner surface of a cardboard box/tray.

The paper is first usually passed through a series of rollers, which are heated-typically to a temperature above 100 degrees Celsius (e.g. 140 degrees Celsius). This ensures moisture is removed by evaporation, so that the paper is provided in a consistent state before entering the single facer unit or the double facer unit. In addition, the heated rollers serve to heat the paper to enhance its elasticity.

The corrugating medium is then sometimes conditioned using directly applied steam to cause the paper to become moist and pliable, before being fed between a pair of corrugating rollers. Both of the corrugating rollers are also heated-typically to a temperature above 100 degrees Celsius (e.g. 140 degrees Celsius). The heat helps to maintain the pliability of the corrugating medium as it is bent into corrugations. The corrugating rollers have interlinking teeth, similar to the meshing of gears, that corrugate the corrugating medium. That is, the paper is forced into the gap between interlocking ridges of the corrugating rollers (which is sometimes known as the labyrinth) to form a corrugated layer of paper.

The corrugated layer is sometimes known as fluted web, fluted liner or corrugated liner, and the ridges of the fluted web are sometimes called flutings.

Due to the pliable nature of the freshly heated and steamed corrugating medium, the paper remains held in place on the large corrugating roll as it rotates. A gluing station then provides a thin layer of starch glue to the outer ridges or flutings of the fluted web.

The gluing station is typically a bath of glue having a roller constantly touching the surface of the glue, such that a thin layer of glue is transferred onto the roller as it rotates. The glue is then transferred from the roller to the fluted web either directly or via intermediate transfer rollers.

The inner liner is fed through a series of rollers (which may be heated) and onto the glued layer of the fluted web, where it bonds to the outer ridges. This combination of corrugated medium bonded to the inner liner is usually known as single faced web. The single faced web, which has poor rigidity, is fed onto the conveyor bridge.

The conveyor bridge is usually run at a slower pace than the output of the single facer unit so that the single face web forms loops on the conveyor bridge to take up the slack of the single faced web. The glue between the fluting web and the inner liner must dry whilst it is on the conveyor bridge before the single faced web is fed into the double facer unit.

The double facer unit glues an outer liner to the single faced web to provide the final double faced paperboard. Starch glue is supplied from a second glue station to the exposed ridges or flutings of the fluted web opposite the inner liner. A further roll supplies an outer liner to the double facer unit. The outer liner is fed through a series of rollers (which may be heated) and brought into contact with the glued side of the single faced web.

The double faced paperboard is then dried and cooled to provide a three-ply laminated paperboard, which can then be cut to any desired shape ready for use.

The corrugating process of the prior art is generally very long, and can be up to one hundred or more metres. The conveyor bridge allows a buffer between the single facer unit and the double facer unit that allows one or the other to be stopped or slowed for a short time without the need for stopping/slowing the other. In this case the amount of loops of single faced web stored on the conveyor bridge is increased or decreased.

For example, if a new paper roll was needed to be installed at the double facer unit, the double facer unit speed could be reduced whilst the paper roll was exchanged. During this time, the single facer unit remains constant and so the number of loops that build up on the conveyor bridge increases. Similarly, if a paper roll was changed on the single facer unit, the number of loops of single faced web stored on the conveyor bridge would decrease.

For this reason, the total amount of paper on the conveyor bridge, and consequently the length of time the single faced web spends on the bridge can vary considerably, depending on the recent history of the apparatus.

In order that the starch glue between the inner liner and the fluted web is dry, the conveyor bridge must be very long to ensure that the single faced web is completely dry and that the single faced web reaches the double facer unit in a consistent condition. Of course, at this point, the single faced web will have lost heat, and must be preconditioned by using heater units prior to being fed into the double facer unit, requiring further energy input.

The corrugated paperboard manufacturing apparatus of the prior art has many disadvantages.

The size of the apparatus is very large, making it unsuitable for use at the point of use, and requiring dedicated large-scale manufacturing premises and a large workforce to keep the apparatus running. This in turn means that the bulky corrugated paperboard needs to be shipped to the point of use, which is both expensive and not environmentally friendly.

The requirement to provide heat to the corrugating medium prior to corrugation requires a large steam boiler to provide enough steam to heat large manufacturing volumes. This requires very large energy consumption and further increases the size of the facilities needed to house the equipment.

The need to reheat the single faced web after cooling on the conveyor bridge requires still further input of energy.

The untensioned single faced web is left to dry on the conveyor belt, and so is susceptible to varying drying conditions depending on the atmospheric conditions. Therefore, warpage and shrinkage of the single faced web as well as variations and irregularities in the flutings can occur.

For all of the aforesaid reasons, conventional corrugator lines are not as productive and efficient as they might be. Also they do not produce corrugated board of as consistently high a quality as might be desired.

It would be desirable to reduce the size of the equipment to allow the installation of the apparatus at the point of use.

It would be still further desirable to reduce the energy consumption during manufacture of the corrugated paperboard to reduce production costs and to reduce the environmental impact.

It would also be desirable to produce a consistent product with no (or minimal) warping or wash boarding, and with increased strength for the same weight of paper.

It is therefore an aim of the present disclosure to provide a method and apparatus for manufacturing corrugated paperboard that each address one or more of the problems above or at least provide a useful alternative.

SUMMARY OF THE DISCLOSURE

To address the above-mentioned issues associated with the prior art, the present disclosure avoids the use of heat or steam in the manufacture of a fluted web for corrugated paperboard and provides a compact corrugated paperboard manufacturing apparatus.

In particular, the disclosure relates to the manufacture of corrugated paperboard using a cold (non-heated) corrugator, at least up to and including formation of a fluted web. In some embodiments, no heat will be used anywhere in the process of manufacturing the corrugated paperboard. In some embodiments, no heat will be used in the forming of a fluted web, although heat may be used for glue drying (e.g. via an infrared (IR) heater) after the fluted web is glued to a first liner and/or a second liner. Accordingly, no heat will be used to condition the corrugating medium.

According to one aspect of the present disclosure, there is provided a method for manufacturing corrugated paperboard, the method comprising:

- directing a corrugating medium from a corrugating medium supply roll to a pair of corrugating rolls; and
- operating the pair of corrugating rolls to corrugate the corrugating medium;
- wherein each corrugating roll is operated at ambient temperature.

Thus, embodiments of this disclosure provide a cold corrugator in which heat is not required in order to manufacture consistently high quality, high strength corrugated paperboard.

It will be understood that the ambient temperature is a natural environmental temperature, whereby neither heating nor cooling is actively applied to the corrugating rolls during formation of the corrugations in the corrugating medium. As such, a typical ambient temperature may be room temperature, which may be between about zero degrees Celsius and about 60 degrees Celsius depending on the location of the apparatus and the local environment.

In addition, no heat may be applied to the corrugating medium prior to formation of the corrugations.

The method may also be steam-free. That is to say, neither the corrugating medium nor the fluted web are moistened by steam and as such they may be considered to be dry.

The step of operating the pair of corrugating rolls to corrugate the corrugating medium may comprise forming a fluted web in which the corrugating medium substantially conforms around a plurality of corrugator peaks and is spaced from a plurality of corrugator troughs in at least one of the pair of corrugating rolls. This places less strain on the corrugating medium, ensuring that the paper does not tear even in the absence of heat and moisture. It may also help to provide a larger, flatter surface area at the peaks of the flutes for adhering more effectively to a liner paper.

The step of operating the pair of corrugating rolls may comprise spacing the pair of corrugating rolls and/or applying pressure such that corrugator peaks of a first roll are spaced from corrugator troughs of a second roll when the pair of corrugating rolls are meshed together. As above, this places less strain on the corrugating medium, ensuring that the paper does not tear even in the absence of heat and moisture.

At least one of the pair of corrugating rolls may comprise a series of corrugations having a height that is at least 10% larger than a target flute height for the corrugating medium. This similarly ensures the cold corrugating medium does not tear when passing through the pair of corrugating rolls.

At least one of the pair of corrugating rolls may comprise a series of corrugations having a height to pitch ratio of at least 0.5. This is larger than a traditional corrugator which may have a height to pitch ratio of around 0.4. This feature also helps to ensure that the paper is not required to meet the base of the corrugator troughs in order to form a desired flute height, which, again, reduces the risk of tearing of the cold corrugating medium.

At least one of the pair of corrugating rolls may comprise a series of corrugations having a height to pitch ratio of at least 0.6. In some cases, the height to pitch ratio may be approximately 0.65.

The corrugating medium supply roll may be operated at ambient temperature. In fact, no heating may be required to any part of the apparatus during use, thus, providing significant energy savings and allowing the method to be carried out using a more compact apparatus. In some embodiments, no heating may be applied to condition the corrugating medium prior to the formation of corrugations. In some embodiments, no heating may be applied to any of the rolls.

The ambient temperature may be a temperature of less than 60 degrees Celsius. In some instances, the ambient temperature may be less than 50 degrees Celsius, less than 40 degrees Celsius, less than 30 degrees Celsius, less than 20 degrees Celsius or less than 10 degrees Celsius.

The corrugating medium may have a moisture content consistent with ambient conditions when passed through the pair of corrugating rolls. In other words, there is no need for moisture or steam to be applied to the corrugating medium. This is because the apparatus is arranged to form the corrugations in such a way as to place less strain on the corrugating medium (e.g. by not forcing the paper to the base of the corrugator troughs) so that it is not necessary for the paper to be made pliable by adding moisture.

The method may comprise manufacturing corrugated paperboard without the use of a heat source. Thus, providing significant energy savings. In some embodiments, no heat source may be employed in the method at least up to and including formation of a fluted web. In some embodiments, no heat will be used in the forming of a fluted web, although heat may be used for glue drying (e.g. via an infrared (IR) heater) after the fluted web is glued to a first liner and/or a second liner.

The method may comprise manufacturing corrugated paperboard without the use of steam. It is believed that some advantages of not using steam are that the paper will better retain its strength and there may be a reduced tendency for warping.

The method may further comprise employing a vacuum system to retain the corrugating medium, when corrugated into a fluted web, on one of the pair of corrugating rolls for a predefined part of a revolution. The vacuum helps to hold the flutes of the fluted web in place against the resilient forces urging the cold paper to spring back to a flat configuration.

The method may further comprise bonding a first liner to a first side of the fluted web to form a single-faced web whilst the fluted web is retained on the one of the pair of corrugating rolls by the vacuum system. This ensures the flutes are retained in a desired configuration whilst the liner is bonded in place. A heat source may be employed to speed up the bonding process (e.g. whilst the fluted web is retained on the one of the pair of corrugating rolls. However, such a heat source, if provided, will be directed to the paper after it has been corrugated. In addition, such a heat source will be located externally (not internally) of the pair of corrugating rolls. Consequently, heat from such a heat source will be directed to an exterior surface of the first liner and fluted web.

The method may further comprise bonding a second liner to a second side of the fluted web to form a double-faced web. As above, a heat source may be provided to speed up the bonding process for the second liner.

The bonding may be by a thermoplastic glue such as polyvinyl acetate (PVA) glue or a polyethylene glue, for example. The bonding may be by a water-based glue. The bonding may be by a non-carbohydrate-based glue. Such glues are preferable to starch glue, which significantly wets the fluted web and liner, making it more likely to tear, increasing drying time and reducing the overall strength of the paperboard. PVA glue, for example, is not as wet and can cure rapidly at ambient temperature, further reducing the need for heat.

According to a second aspect of this disclosure, there is provided a corrugated paperboard manufactured by the method above. Such corrugated paperboard may be stronger for the same weight of paper when compared to corrugated paperboard made using traditional manufacturing methods as the absence of heat and steam (at least during formation of the corrugations) is believed to ensure the strength of the paper is retained throughout the manufacturing process such that there is a lower tendency for the corrugated paperboard to warp. In addition, the flutes of the corrugated paperboard may be uniform and have larger and flatter peaks, which may provide a better surface for bonding and may result in less wash boarding. The provision of PVA glue (or the like) may also ensure a stronger bond to the liner. The increase in strength per weight of paper may also mean than lower weights of paper can be used to provide a given strength of corrugated paperboard and this may result in less material being required which is better for the environment.

According to a third aspect of this disclosure, there is provided an apparatus for manufacturing corrugated paperboard, the apparatus comprising:

- a pair of corrugating rolls configured to corrugate a corrugating medium when operated at ambient temperature.

The pair of corrugating rolls may be configured to be operated such that corrugator peaks of a first roll are spaced from corrugator troughs of a second roll when the pair of corrugating rolls are meshed together.

At least one of the pair of corrugating rolls may comprise a series of corrugations having a height that is at least 10% larger than a target flute height for the corrugating medium.

At least one of the pair of corrugating rolls may comprise a series of corrugations having a height to pitch ratio of at least 0.5.

At least one of the pair of corrugating rolls may comprise a series of corrugations having a height to pitch ratio of at least 0.6.

The apparatus may further comprise a corrugating medium supply roll configured to direct a corrugating medium to the pair of corrugating rolls and wherein the corrugating medium supply roll is configured to be operated at ambient temperature.

The apparatus may be configured for manufacturing corrugated paperboard without the use of a heat source, at least up to and including formation of a fluted web.

The apparatus may be configured for manufacturing corrugated paperboard without the use of steam.

The apparatus may further comprise a vacuum system configured to retain the corrugating medium, when corrugated into a fluted web, on one of the pair of corrugating rolls for a predefined part of a revolution.

The apparatus may further comprise a first bonding assembly arranged for bonding a first liner to a first side of the fluted web to form a single-faced web whilst the fluted web is retained on the one of the pair of corrugating rolls by the vacuum system.

The apparatus may further comprise a second bonding assembly arranged for bonding a second liner to a second side of the fluted web to form a double-faced web.

The first bonding assembly and/or the second bonding assembly may comprise a press roll and wherein the press roll is configured to be operated at ambient temperature.

The ambient temperature may be a temperature of less than 60 degrees Celsius.

According to a fourth aspect of this disclosure, there is provided a corrugated paperboard manufactured using the apparatus above.

BRIEF DESCRIPTION OF THE PREFERRED EMBODIMENTS

Some embodiments of the disclosure will now be described by way of example only and with reference to the accompanying drawings, in which.

DETAILED DESCRIPTION OF THE PREFERRED EMBODIMENTS

Generally speaking, the disclosure provides an apparatus and method for manufacturing corrugated paperboard without the use of heat, at least up to and including formation of a fluted web.

Some examples of the solution are given in the accompanying figures.

Figure 1:
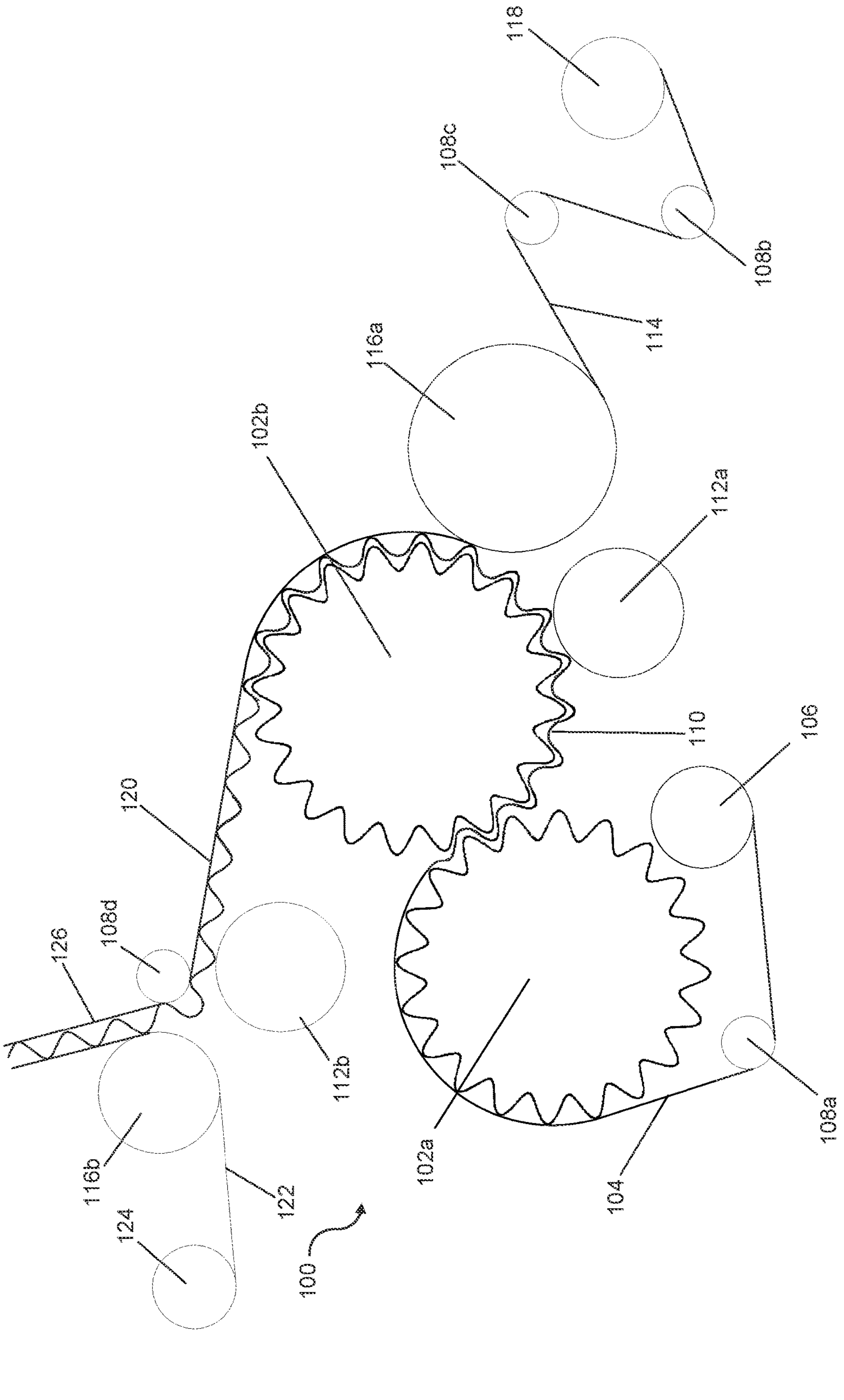
FIG. 1 shows a schematic view of an apparatus for manufacturing corrugated paperboard in accordance with the present disclosure.

FIG. 1 shows an apparatus 100 for manufacturing corrugated paperboard in accordance with the present disclosure. The apparatus 100 comprises a pair of corrugating rolls 102*a* and 102*b* configured to corrugate a corrugating medium 104 when operated at ambient temperature (e.g. not actively heated or cooled from within). The corrugating medium 104 is a large sheet of paper provided on a corrugating medium supply roll 106. As shown in FIG. 1, the corrugating medium 104 is directed to the first corrugating roll 102*a* via a directional roller 108*a*. However, in other embodiments, the corrugating medium 104 may be directed to the first corrugating roll 102*a* directly from the corrugating medium supply roll 106 or any number of directional rollers may be provided in the path of the corrugating medium 104. The corrugating medium supply roll 106 and directional roller 108*a* are also operated at ambient temperature (e.g. not heated from within).

The corrugating medium 104 is forced between meshing teeth of the pair of corrugating rolls 102*a* and 102*b* to form an undulating fluted web 110, as will be described in more detail below with respect to FIG. 2. The corrugating rolls 102*a* and 102*b* are configured to pull the corrugating medium 104 from the corrugating medium supply roll 106 to form the fluted web 110. The fluted web 110 is retained on the corrugating roll 102*b* by a vacuum force applied from within the corrugating roll 102*b* to suck air, along with the corrugating medium 104, inwardly through small holes (not shown) in the outer surface of the corrugating roll 102*b*. The vacuum force retains the fluted web 110 on the corrugating roll 102*b* for a predefined part of a revolution and ensures the fluted web 110 is brought into contact with a bonding agent from a first bonding station 112*a* before being bonded to a first liner 114 via a first press roll 116*a*. Taken together, the first bonding station 112*a* and first press roll 116*a* may be considered as a first bonding assembly arranged for bonding the first liner 114 to a first side of the fluted web 110 to form a single-faced web 120.

The first liner 114 is a large sheet of paper provided on a first liner supply roll 118. As shown in FIG. 1, the first liner 114 is directed to the first press roll 116*a* via two directional rollers 108*b* and 108*c*. However, in other embodiments, the first liner 114 may be directed to the first press roll 116*a* directly from the first liner supply roll 118 or any number of directional rollers may be provided in the path of the first liner 114. The first liner supply roll 118 and directional rollers 108*b* and 108*c* are also operated at ambient temperature.

The bonding agent may be a thermoplastic glue such as polyvinyl acetate (PVA) glue. This is preferable to starch glue, which significantly wets the fluted web and liner, making it more likely to tear, increasing drying time and reducing the overall strength of the paperboard. PVA glue, on the other hand, is not as wet and can cure rapidly at ambient temperature, further reducing the need for heat.

The single-faced web 120 is then directed from the corrugating roll 102*b* to a second bonding assembly arranged for bonding a second liner 122 to a second side of the fluted web 110 to form a double-faced web 126. The second bonding assembly comprises a second bonding station 112*b* and a second press roll 116*b*. In the embodiment, shown in FIG. 1 a directional roller 108*d* is provided between the second bonding station 112*b* and the second press roll 116*b*. In other embodiments, no directional rollers may be required between the second bonding station 112*b* and the second press roll 116*b* or multiple directional rollers may be provided. Also, in this embodiment, no directional rollers are provided between the corrugating roll 102*b* and the second bonding station 112*b*. In other embodiments, one or more directional rollers may be provided between the corrugating roll 102*b* and the second bonding station 112*b*.

The second liner 122 is a large sheet of paper provided on a second liner supply roll 124. As shown in FIG. 1, the second liner 122 is directed to the second press roll 116*b* directly.

However, in other embodiments, the second liner 122 may be directed to the second press roll 116*b* via one or more directional rollers. The second liner supply roll 124 and directional roller 108*d* are also operated at ambient temperature.

In some embodiments, the second liner 122 may not be required and the output from the apparatus 100 may be the single-faced web 120. In other words, the second bonding assembly may not be required.

In some embodiments, the apparatus 100 may be configured to produce corrugated paperboard having multiple layers of corrugated material and/or liner material by feeding the single-faced web 120 or double-faced web 126 through additional equipment configured to bond additional layers in a similar manner to that described above.

As shown in FIG. 1, the apparatus 100 may be relatively compact. Advantageously, each corrugating roll 102*a*, 102*b* is configured for operation at ambient temperature, which may be a temperature of less than 60 degrees Celsius. This significantly reduces complexity of the apparatus 100 and its energy consumption when compared to systems requiring heated corrugating rolls, which are typically heated to well in excess of 100 degrees Celsius (e.g. 180 degrees Celsius). Furthermore, there may be no need to heat any of the components of the apparatus 100, further reducing energy consumption.

In addition, no steam is required to wet the corrugating medium 104 to make it more pliable prior to forming the fluted web 110. This further reduces energy consumption as well as eliminating the need for a lengthy drying time, thereby allowing the apparatus 100 to be compact. Furthermore, the absence of steam means the corrugated paperboard may be less likely to warp as this is believed to be caused by different drying times in different areas of the corrugated paperboard.

Although the corrugating rolls 102*a* and 102*b* are shown as approximately the same size in FIG. 1, this need not be the case. In fact, it may be advantageous for a first (e.g. lower) corrugating roll 102*a* to have a smaller diameter than a second (e.g. upper) corrugating roll 102*b* as this reduces the number of meshing corrugations which can help to prevent tearing of the corrugating medium (e.g. because less paper is stretched when the corrugations are formed). In an example, the first corrugating roll 102*a* may have a diameter of approximately 120 mm, while the second corrugating roll 102*b* may have a diameter of approximately 550 mm. In more general terms, the diameter of the first corrugating roll 102*a* may be 10%, 20%, 25%, 30%, 40%, 50%, 60 or 75% less than the diameter of the second corrugating roll 102*b*. Advantageously, the second corrugator roll 102*b* is the larger of the pair of corrugating rolls to allow a longer drying time for the glue when deposited on the corrugating medium.

Figure 2:
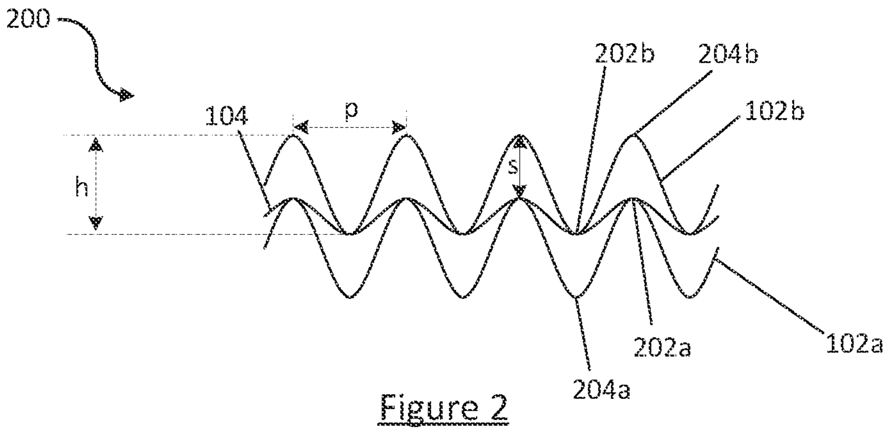
FIG. 2 shows an enlarged view of the corrugating medium passing through the corrugating rolls of the apparatus of FIG. 1.

FIG. 2 shows an enlarged view 200 of the corrugating medium 104 passing between the corrugations in the corrugating rolls 102*a* and 102*b* of the apparatus 100 of FIG. 1. As illustrated, the corrugating medium 104 substantially conforms around corrugator peaks 202*a*, 202*b* and is spaced from corrugator troughs 204*a*, 204*b* in each of the corrugating rolls 102*a*, 102*b*. This arrangement may be due to the spacing between the pair of corrugating rolls 102*a*, 102*b* and/or may be due to an application of a predefined pressure on at least one of the corrugating rolls 102*a*, 102*b* such that corrugator peaks 202*a* of a first roll 102*a* are spaced by a distance s from corrugator troughs 204*b* of a second roll 102*b* when the pair of corrugating rolls 102*a*, 102*b* are meshed together.

In some embodiments, at least one of the corrugating rolls 102*a*, 102*b* may have a series of corrugations having a height h from corrugator trough 204*a*, 204*b* to corrugator peak 202*a*, 202*b* that is at least 10% larger than a target flute height for the corrugating medium 104 when formed into the fluted web 110. For example, to achieve a flute height of 3 mm, a corrugation height h of 3.6 mm may be used, and the corrugator peaks 202*a* of the first roll 102*a* may be spaced from the corrugator troughs 204*b* of the second roll 102*b* by approximately 0.6 mm. To achieve larger flutes, an even larger corrugation height h may be used.

In some embodiments, the first roll 102*a* may have a different corrugation height to the second roll 102*b*. In other embodiments, the first roll 102*a* may have the same corrugation height as the second roll 102*b* but may be backed off from close engagement by a reduced pressure applied to one or both rolls 102*a*, 102*b*.

In some embodiments, the series of corrugations in one or both corrugating rolls 102*a*, 102*b* may have a height h to pitch p ratio of at least 0.5, at least 0.6 or approximately 0.65. Such ratios are significantly larger than for conventional apparatus, which may have a ratio of between 0.3 and 0.4. Accordingly, to achieve a similar flute pitch, the apparatus 100 employs a significantly larger corrugation height.

It has been determined that each of the above features, individually and collectively may help to prevent tearing of the corrugating medium 104 as it is forced between the corrugations in the corrugating rolls 102*a* and 102*b*. Traditional corrugators use heat and/or steam to make the corrugating medium 104 more pliable to prevent tearing. However, in the proposed non-heated ambient apparatus 100, it has been found that tearing that can be prevented (or at least minimised) by one or more of the above features. In particular, it is believed that not forcing the corrugating medium 104 to the base of the corrugating troughs 104*a*, 104*b* helps to reduce strain in the corrugating medium 104 which can lead to tearing.

Furthermore, the described arrangement may form larger, flatter areas at the peaks of the fluted web 110, which may provide a more effective surface for bonding to the liner material.

Figure 3:
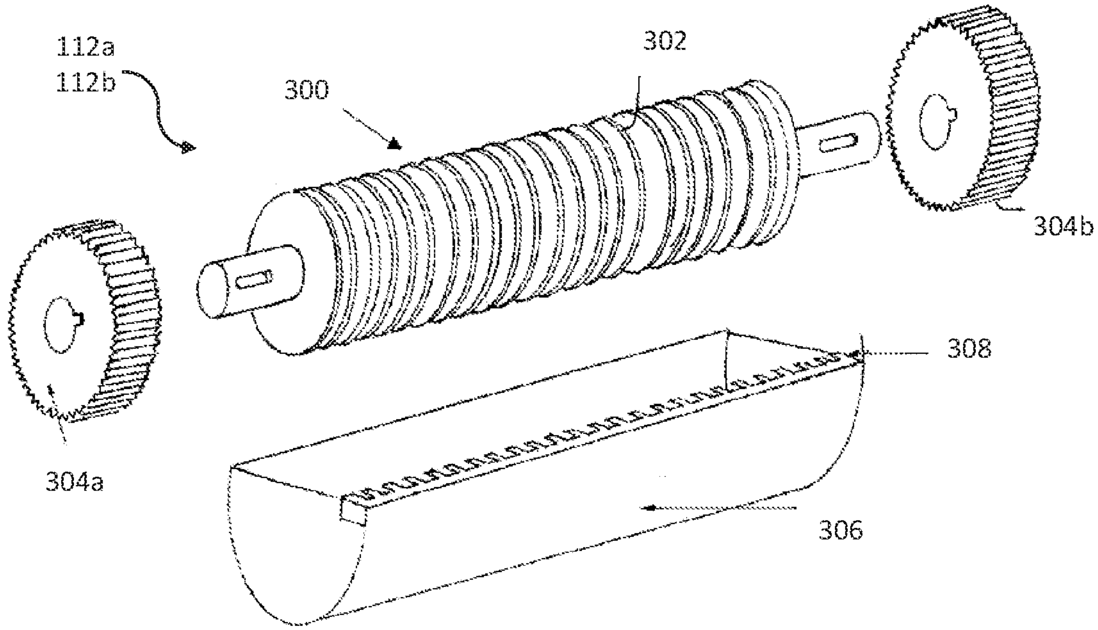
FIG. 3 shows an exploded view of a glue station as employed in the apparatus of FIG. 1.

FIG. 3 shows an exploded view of a bonding station 112*a*, 112*b* as employed in the apparatus of FIG. 1. Each bonding station 112*a*, 112*b* comprises a glue roll 300 comprising a series of circumferential flange-like ring protrusions 302 at even intervals along the axial length of the glue roll 300. Each end of the glue roll 300 is configured to lock into a drive gear 304*a*, 304*b* configured with recesses to engage in the corrugations of the corrugating roll 102*b* such that rotation of the corrugating roll 102*b* causes the glue roll 300 to rotate at the same circumferential speed. On rotation, the protrusions 302 of the glue roll 300 are configured to pass through a glue reservoir provided in a trough 306 before passing through a comb 308 to remove excess glue from the glue roll 300. Further rotation of the glue roll 300 will apply glue present on each of the protrusions 302 to the outer peaks of the fluted web 110 when retained on the corrugator roll 102*b*. The series of protrusions 302 will form a series of glue dots along the length of each peak in the fluted web 110, the spacing between the protrusions 302 determining the spacing between the glue dots. The comb 308 may be adjustable in order to regulate an amount of glue applied to the fluted web 110 and different configurations of protrusions 302 may be employed to vary the size and/or spacing of the glue dots. Other types of bonding stations 112*a*, 112*b* may be provided.

It will be understood that the glue dots on the fluted web 110 will facilitate bonding with a liner material 114, 122 when the liner material is pressed by a press roll 116*a*, 116*b* into contact with the fluted web 110 as shown in FIG. 1 in both the first and second bonding stations 112*a*, 112*b*.

Figure 4:
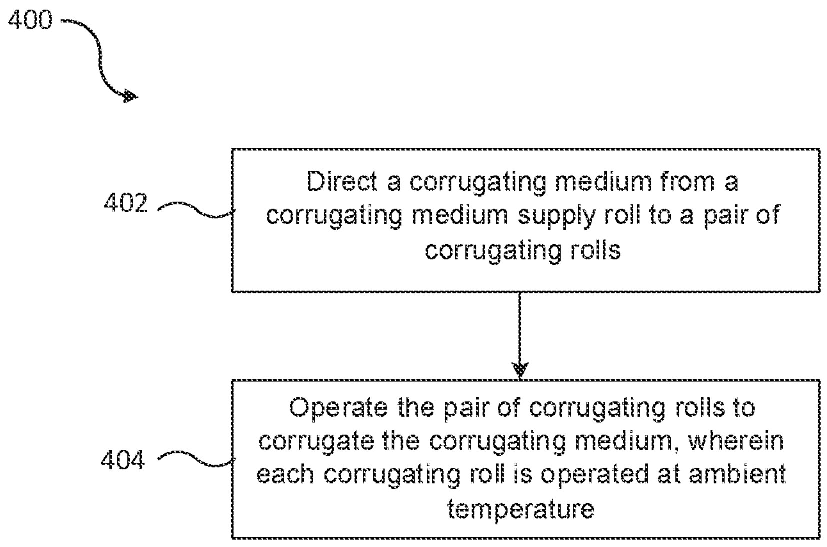
FIG. 4 illustrates a method for manufacturing corrugated paperboard in accordance with the present disclosure.

FIG. 4 illustrates a method 400 for manufacturing corrugated paperboard in accordance with the present disclosure. The method 400 comprises a first step 402 of directing a corrugating medium 104 from a corrugating medium supply roll 106 to a pair of corrugating rolls 102*a*, 102*b*; and a second step 404 of operating the pair of corrugating rolls 102*a*, 102*b* to corrugate the corrugating medium 104, wherein each corrugating roll 102*a*, 102*b* is operated at ambient temperature.

Figure 5A:
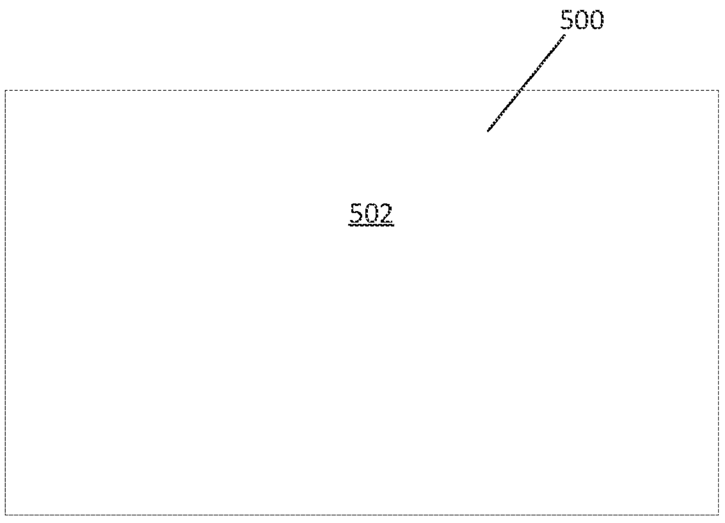
FIGS. 5A and 5B show, respectively, plan and side elevation views of a sheet of corrugated paperboard manufactured in accordance with the present disclosure.
Figure 5B:
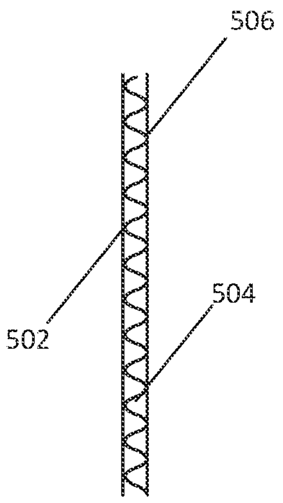

FIGS. 5A and 5B show, respectively, plan and side elevation views of a sheet of corrugated paperboard 500 manufactured in accordance with the present disclosure. The sheet of corrugated paperboard 500 is cut to form a large rectangular cuboid having a first liner 502 bonded on a first side of a fluted web 504 and a second liner 506 bonded on a second side of the fluted web 504.

Advantageously, the corrugated paperboard 500 is believed to have less tendency to warp due to the absence of heat and steam from the manufacturing process. In addition, the corrugated paperboard 500 may be stronger than in the prior art, for the same weight of paper, when made using the described method, as the absence of heat in the process will retain the paper strength. Moreover, the flatter peaks of the fluted web 504 will ensure the paperboard has flatter outer surfaces, and the combination of flatter peaks and PVA glue may enable a stronger bond than in the prior art.

Embodiments of the present disclosure can be employed in many different industries to make corrugated paperboard for a variety of applications including but not limited to packaging.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A method for manufacturing corrugated paperboard, the method comprising:

directing an unheated corrugating medium from a corrugating medium supply roll to a pair of corrugating rolls comprising a first corrugating roll and a second corrugating roll;

operating the pair of corrugating rolls to corrugate the unheated corrugating medium;

employing a vacuum system to retain the unheated corrugating medium, when corrugated into a fluted web, on the second corrugating roll for a predefined part of a revolution; and bonding a first liner to a first side of the fluted web to form a single-faced web whilst the fluted web is retained on the second corrugating roll by the vacuum system;

wherein each corrugating roll is operated at ambient temperature;

wherein manufacturing the corrugated paperboard is without the use of a heat source, at least up to and including formation of corrugations in the unheated corrugating medium;

wherein a diameter of the first corrugating roll is at least 20% less than a diameter of the second corrugating roll; and wherein the vacuum system holds the flutes of the fluted web in place, against resilient forces urging the unheated corrugating medium to spring back to a flat configuration, at least from formation of the fluted web until the first liner is bonded to the fluted web.

2. The method of claim 1 wherein the step of operating the pair of corrugating rolls comprises spacing the pair of corrugating rolls and/or applying pressure such that corrugator peaks of the first corrugating roll are spaced from corrugator troughs of the second corrugating roll when the pair of corrugating rolls are meshed together.

3. The method of claim 1 wherein at least one of the pair of corrugating rolls comprises a series of corrugations having a height that is at least 10% larger than a target flute height for the unheated corrugating medium and/or wherein at least one of the pair of corrugating rolls comprises a series of corrugations having a height to pitch ratio of at least 0.5 or at least 0.6.

4. The method of claim 1 wherein at least one of: the corrugating medium supply roll or a press roll, is operated at ambient temperature; optionally wherein all rolls employed in the manufacture of the corrugated paperboard are operated at ambient temperature.

5. The method of claim 1 wherein the unheated corrugating medium has a moisture content consistent with ambient conditions when passed through the pair of corrugating rolls.

6. The method of claim 1 comprising manufacturing corrugated paperboard without the use of steam, at least up to and including formation of corrugations in the unheated corrugating medium.

7. The method of claim 1 further comprising bonding a second liner to a second side of the fluted web to form a double-faced web.

8. The method of claim 1 wherein the bonding is by PVA glue.

9. A corrugated paperboard manufactured by the method of claim 1.

10. An apparatus for manufacturing corrugated paperboard, the apparatus comprising:

a pair of corrugating rolls comprising a first corrugating roll and a second corrugating roll configured to corrugate an unheated corrugating medium when operated at ambient temperature; and a vacuum system configured to retain the unheated corrugating medium, when corrugated into a fluted web, on the second corrugating roll for a predefined part of a revolution; and a first bonding assembly arranged for bonding a first liner to a first side of the fluted web to form a single-faced web whilst the fluted web is retained on the second corrugating roll by the vacuum system;

wherein the apparatus is configured to manufacture the corrugated paperboard without the use of a heat source, at least up to and including formation of corrugations in the unheated corrugating medium;

wherein a diameter of the first corrugating roll is at least 20% less than a diameter of the second corrugating roll; and wherein the vacuum system is configured to hold the flutes of the fluted web in place, against resilient forces urging the unheated corrugating medium to spring back to a flat configuration, at least from formation of the fluted web until the first liner is bonded to the fluted web.

11. The apparatus according to claim 10 wherein the first bonding assembly comprises a press roll and wherein the press roll is configured to be operated at ambient temperature.

12. A corrugated paperboard manufactured using the apparatus of claim 10.

13. The method of claim 1 wherein the diameter of the first corrugating roll is at least 25%, 30%, 40%, 50%, 60 or 75% less than the diameter of the second corrugating roll.

* * * * *